May 24, 1960  R. T. BURNETT  2,937,720
BRAKE
Filed Sept. 14, 1955  4 Sheets-Sheet 1

INVENTOR.
RICHARD T. BURNETT
BY
John A. Young
ATTORNEY

May 24, 1960 R. T. BURNETT 2,937,720
BRAKE
Filed Sept. 14, 1955 4 Sheets-Sheet 2
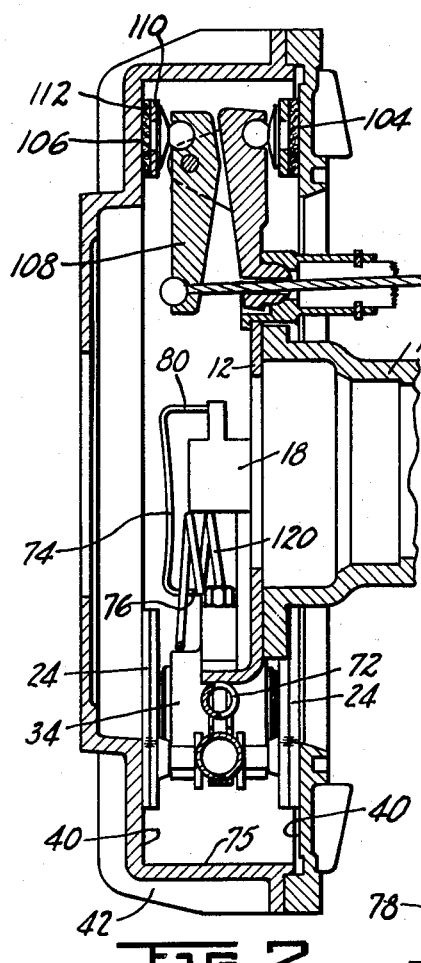
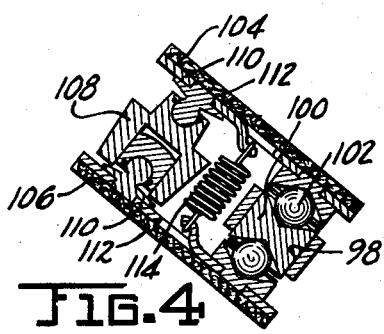
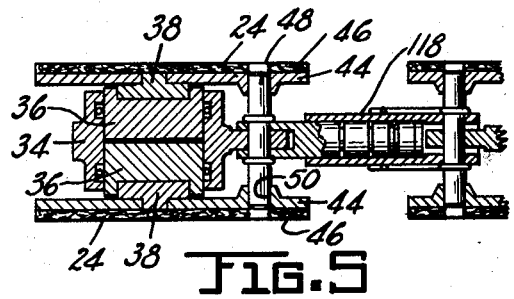
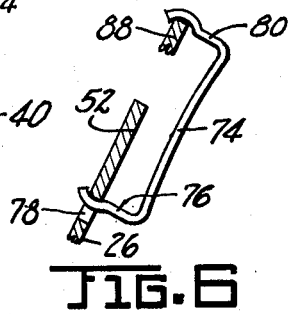
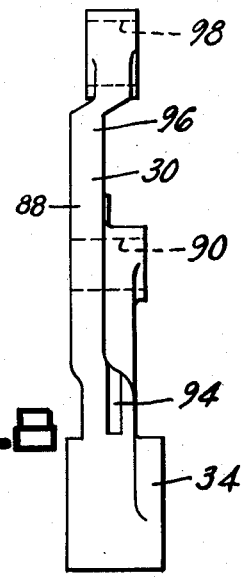
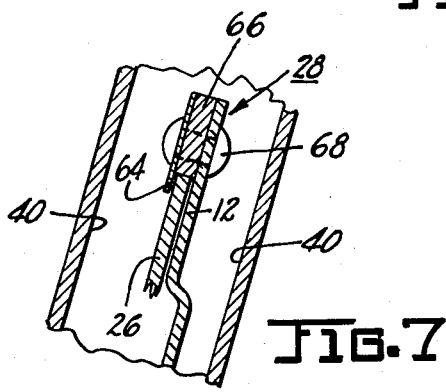
INVENTOR.
RICHARD T. BURNETT
BY
John A. Young
ATTORNEY May 24, 1960  R. T. BURNETT  2,937,720
BRAKE Filed Sept. 14, 1955  4 Sheets-Sheet 3

INVENTOR.
RICHARD T. BURNETT
BY
John A. Young
ATTORNEY

May 24, 1960 R. T. BURNETT 2,937,720
BRAKE
Filed Sept. 14, 1955 4 Sheets-Sheet 4

INVENTOR.
RICHARD T. BURNETT
BY John A. Young
ATTORNEY

United States Patent Office 2,937,720
Patented May 24, 1960

2,937,720
BRAKE

Richard T. Burnett, South Bend, Ind., assignor to Bendix Aviation Corporation, South Bend, Ind., a corporation of Delaware Filed Sept. 14, 1955, Ser. No. 534,338

15 Claims. (Cl. 188—70)

This invention relates generally to a kinetic-energy-absorbing device, and more specifically to a combination disk and shoe brake wherein disk elements supply the necessary actuating force for applying the shoe which is free floating relative to an associated fixed anchor.

To meet the requirements of high kinetic-energy-absorbing applications, it has been discovered highly beneficial to incorporate in the device a combination of both "disk" friction elements and arcuate "shoe" friction elements with the object of increasing the swept rotor area. The underlying reason for this is to reduce operating temperatures so that "fade" or loss in effectiveness is prevented. Thus performance of the device may be made more consistent and reliable during high kinetic-energy-absorbing usage. This entirely new concept of vehicle braking is fully described in my copending applications, identified as: application No. 324,167, filed December 5, 1952, now abandoned; application No. 369,197, filed July 20, 1953, now Patent No. 2,871,990; application No. 466,861, filed November 4, 1954; application No. 476,170, filed December 20, 1954, now Patent No. 2,888,105; application No. 482,827, filed January 19, 1955; and application No. 521,214, filed July 11, 1955.

The innovation of the present invention has to do with provision of separate anchors for the disk elements and arcuate shoe element and further providing that the arcute shoe element is slidable on its associated anchor to be free floating within the brake.

Among the various objectives which are attained by the invention is that the brake is made more effective. Because of the free floating construction, I can provide any preferred wedging angle for the anchor associated with the arcuate "shoe."

Providing a separate anchor for the "disk" and "shoe" elements, respectively, makes it possible to select the desired anchor ratio for the arcuate shoe; the effectiveness of the shoe may thus be made a matter of preference. Furthermore, by suitably relating the radii of the anchors for the "disk" and "shoe," it is possible to select an optimum lever ratio for the applying effort of the "disk" actuating force which is exerted on the arcuate "shoe," and also obtain a suitable anchor ratio which improves brake controllability and prevents brake "lockup."

The usual advantages of a free floating shoe are incorporated in the brake. Generally, those advantages involve improved effectiveness and greater facility in adjusting and assembling the brake. While the free floating shoe concept is not per se new in the present invention, it is considered novel to provide a composite disk-and-shoe friction unit with a floating shoe.

A further feature of the invention is that the foregoing advantages may be provided for front and rear wheel brakes of vehicles, the rear wheel brakes being further equipped with a mechanically applied parking brake arrangement.

A performance improvement of the present invention is that the brake can withstand a higher order of torque loads since two distinct anchors are provided for each brake unit and torque loading per anchor is very greatly reduced.

Other objects and features of the invention will become apparent from a consideration of the following description which proceeds with reference to the accompanying drawings, wherein;

Figure 1 is a side elevation of the rear wheel brakes equipped with a parking brake;

Figures 2, 3, 4, 5, 6, and 7 are section views taken on the respective lines 2—2, 3—3, 4—4, 5—5, 6—6, and 7—7 in Figure 1;

Figure 8 is a detail view of the casting shown in Figure 1, looking in the direction indicated by the arrows 8—8 in Figure 1;

Figures 10, 11, 12, 13, and 14 are section views taken on the respective corresponding lines indicated in Figure 8.

*Rear wheel brakes*

Figure 1:
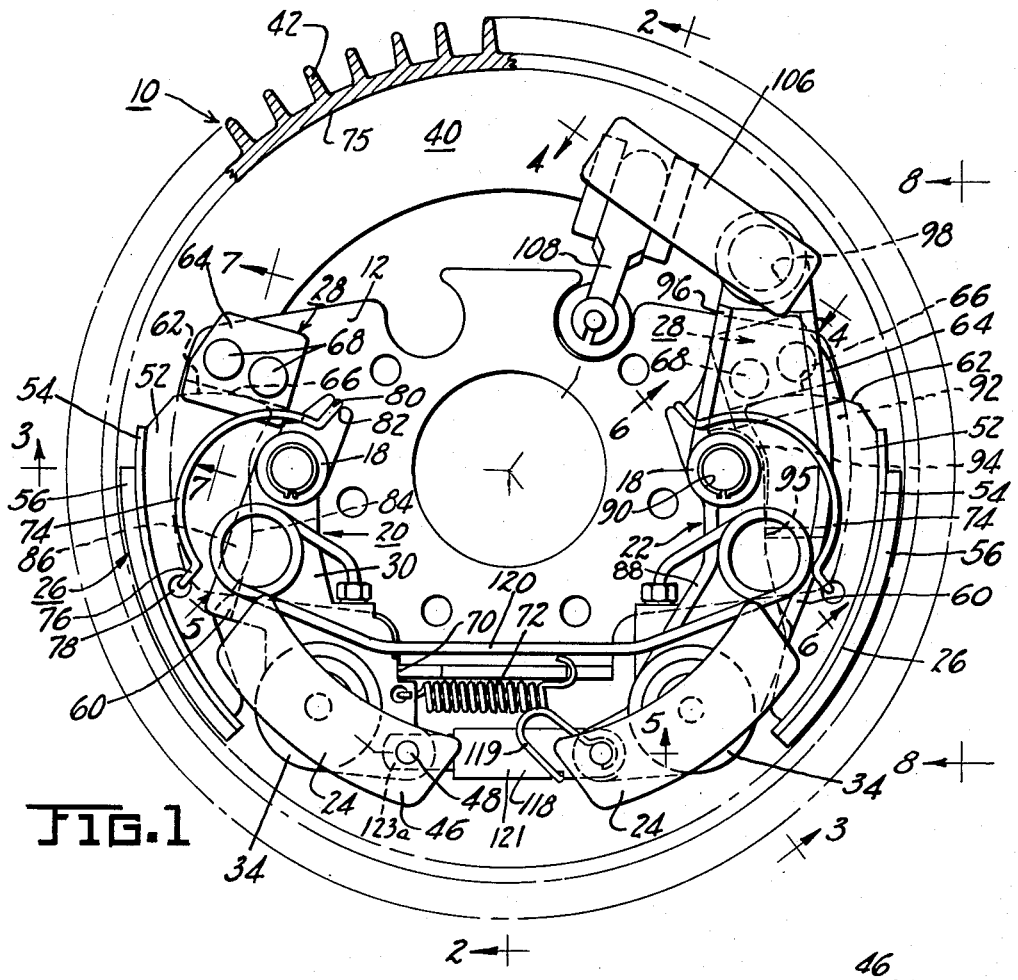
Figure 3:
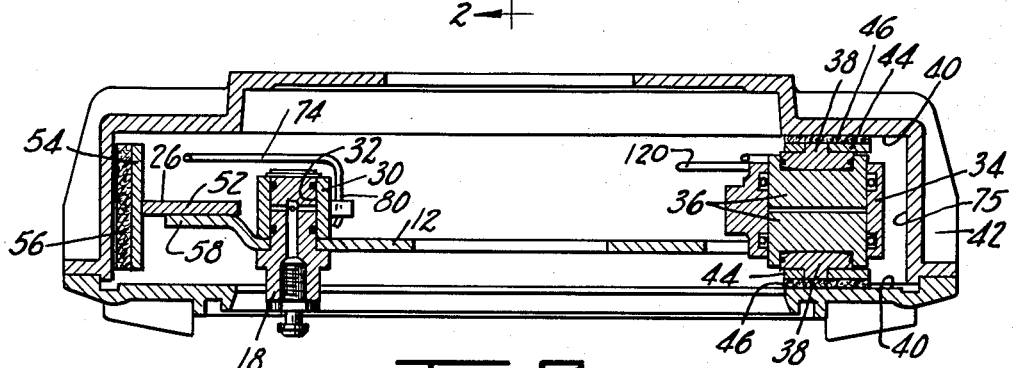
Figure 10:
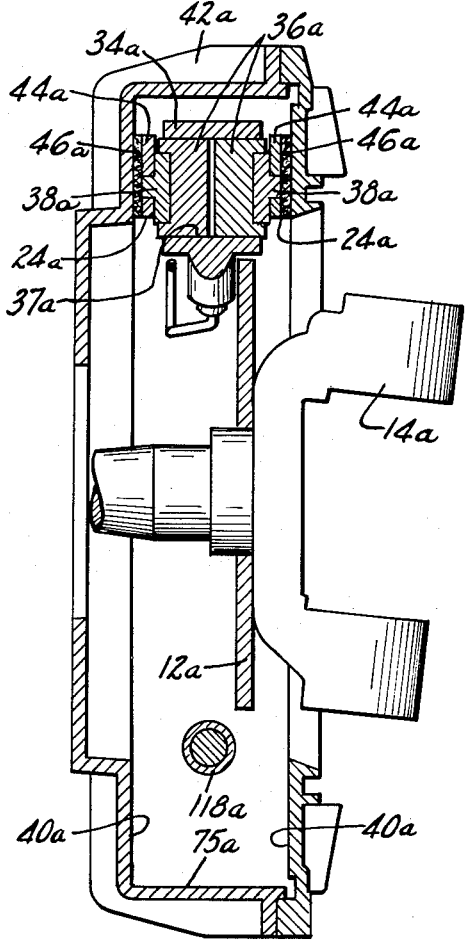
Figure 12:
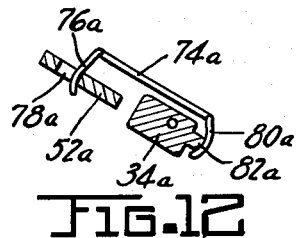

Referring first to the embodiment shown in Figures 1 to 7, the brake is indicated generally by reference numeral 10. Support member 12 is fastened to a fixed part of the vehicle, such as an axle housing 14 (Figure 2), by means of bolts or the like (not shown). As opposite sides of the support member 12, there are provided upright anchor posts 18 (Figures 1 and 3). Associated with anchor posts 18 are friction units 20 and 22, respectively.

Friction unit 20 on the left hand side of Figure 1 comprises "disk" friction elements 24 (Figure 5) and an arcuate "shoe" friction element 26 which is slidably associated with anchor 28. A casting 30 having an opening 32 (Figures 1 and 3) is mounted on anchor 18 and pivots thereon. At the other end of the casting, there is formed a cylinder 34 (Figures 1 and 5) which receives two oppositely-acting pistons 36. The "disk" friction elements 24 are carried by pistons 36 through intermediate thrust members 38 which are free to swivel, ensuring full contact between the disk elements and spaced sides 40 of rotor 42.

The "disk" friction elements 24 each consist of a flat backing member 44, having a layer of friction material lining 46 secured thereto. The ends of the backing members are guided by a transverse pin 48 (Figure 5) which extends at opposite ends thereof into openings 50 (see Figure 5).

The arcuate "shoe" friction element 26 consists of a web 52, a transverse rim 54, and an arcuate lining segment 56, which is bonded or fastened in some suitable manner to the surface of the rim (Figures 1 and 3). The arcuate shoe is positioned laterally by means of an offset ledge 58, which is part of support member 12 (Figure 3). The offset ledge 58 contacts one side of the web 52. Both sides of the web 52 are contacted by a slotted portion 60 of the casting 30.

The arcuate shoe is further positioned by means of a plate 64 (see Figure 7) which overlies part of the curved pivot end 62 of the arcuate shoe 26. Between the plate 64 and support member 12 is a hardened plate 66 which forms a part of the anchor 28. The plates 64 and 66 are securely fastened to the support member 12 by means of rivets 68. The plate 64 and offset ledge 58 are spaced sufficiently far apart so that the end 62 of the arcuate shoe can turn within the space provided between the plates. Note in Figure 7 that the plate 64 and support member 12 are spaced apart a greater distance than the thickness of web 26. The arcuate shoe is also free to slide on the engageable surface of plate 66 so that radial adjustment of the shoe is obtained. It is apparent from the lateral positioning arrangement that the arcuate shoe is free floating.

Counterclockwise turning of casting 30 on the anchor 18 (left hand side of Figure 1) is limited by an abutment 70, which is formed from a turned up portion of the support member 12. A spring 72 is fastened between the casting 30 and the turned up part of the support plate 12. The casting is thus rotated about anchor 18 until it contacts abutment 70. As the return spring 72 swings the casting 30 into engagement with abutment 70, the arcuate shoe 26 is pivoted on curved end 62 so that friction material lining 56 is withdrawn from contact with cylindrical surface 75 of the rotor.

The casting 30 and arcuate shoe 26 are held together by means of a wire spring 74 (Figures 1 and 6). One leg 76 of the wire spring passes through an opening 78 in the web 52 of the arcuate shoe 26; the other leg 80 of the wire spring is received in a slot 82 formed at the end of the casting 30. Of considerable importance is the direction of force exerted by spring 74. This spring force direction is located in relation to anchor 28 so that one component of the spring force pulls the shoe against the anchor 28, and another component pivots the arcuate shoe so that edge 84 of the web is brought into engagement with a slotted portion 86 of casting 30.

Referring now to unit 22 on the right hand side of Figure 1, casting 88 has an opening 90 approximately midway between the ends thereof (Figure 8). Anchor 18 extends through opening 90 to mount the casting 88. At the one end of casting 88, there is formed a cylinder 34 and disk friction elements 24, the same as in friction unit 20. Disk friction elements 24 may be of the same size and construction as those in friction unit 20 to permit standardization in construction. Misassembly of the disk elements is thus obviated.

An arcuate "shoe" 26, which is identical with the one previously described, is fitted between an axially offset ledge 92 on the support member 12 and the portion of casting 88 which overlies the web 52 of the arcuate shoe segment. The arcuate shoe segment is thus maintained in a proper lateral position. The casting 88 is slotted at 94 to receive the web 52 of the brake shoe in order that turning of the casting on anchor 18 will produce pivoting of the shoe on anchor 28. The pivoting of the shoe brings lining segment 56 against the cylindrical surface 75 of the rotor 42. Spring 74 is fastened between casting 88 and the shoe 26 so that the shoe 26 is retracted from surface 75 of the rotor and held against casting 88 (Figures 1 and 6). The force of spring 74 is also utilized to hold the shoe segment against anchor 28 which may be of the same construction as the anchor 28 for unit 20.

End 96 of the casting extends beyond anchor 28 and is provided with an opening 98 formed therein to receive an insert 100 (Figure 4). Ball-and-ramp cams 102 are formed on opposite sides of the insert 100. Two flat friction elements 104 and 106 are carried at one end by the insert 100 through ball-and-ramp cams 102, and at the other end by articulated levers 108 (Figures 1, 2, and 4).

The flat friction elements 104 and 106 each consist of a backing member 110 and a flat segment of friction lining 112 which is secured thereto. The articulated levers 108, which are used to apply the elements 106 and 104, are fully described in copending application No. 466,862, filed November 4, 1954. The construction of the parking brake does not of itself form a part of the present invention. It does constitute, however, an important part of the present invention that the parking brake is combined with a housing having a freely floatable shoe friction element associated therewith. As shown in Figure 4, a return spring 114 is fastened between the two friction elements 104 and 106 to hold them in a normally retracted position.

An adjustable strut 118 connects the cylinder portions of units 20 and 22 so that when the rotor 42 is turning clockwise, the clockwise movement of casting 88 communicates applying effort to the arcuate shoe 26 associated with unit 20 by producing pivotal movement of casting 30. The strut includes a sleeve 121 and plunger 123 with a viscous coating therebetween.

The adjustable strut 118 positions the arcuate shoe 26 associated with unit 22 by determining the angular location of casting 88 on anchor 18.

A conduit 120 (Figure 2) connects the fluid motors in each of the brake units so that a fluid pressure source need be connected to only one of the units. Fluid pressure which is transmitted to one of the fluid motors is communicated to the other brake unit. Accordingly, there is provided an inlet connection for only one of the fluid motors and a bleed connection for the other of the fluid motors in order to operate and bleed the entire hydraulic system.

*Operation*

When the rear wheel brakes are applied with forward vehicle movement, the rotor is turning in a counterclockwise direction, Figure 1. Fluid pressure which is developed by the operator's applying effort, is transmitted to the brake units. For purposes of explanation, it will be assumed that the fluid pressure is first communicated to cylinder 34 in brake unit 22, and then to cylinder 34 in brake unit 20. The pistons 36 in each of the brake units force the "disk" or "flat shoe" elements apart, bringing lining 46 into forcible engagement with sides 40 of the rotor (Figure 3). The wiping action of the rotor produces a tendency of the "disk" friction elements to shift circumferentially with the rotor and this circumferential movement of the disk friction elements 24 causes the units 20 and 22 to rotate about their associated anchors 18 in a counterclockwise direction. Referring first to unit 22, and the casting 88 of unit 22 turns, it pushes against the associated arcuate shoe 26 at the point of abutment 95; thus, the arcuate shoe is caused to pivot on curved end 62, which contacts the anchor 28. The casting 88 continues to rotate about the anchor 18 until the arcuate friction material lining 56 is brought into complete engagement with surface 75 of the rotor. When the friction lining 56 is fully engaged with surface 75, the arcuate shoe is prevented from further pivoting on anchor 28. From the explanation of the device it is apparent that the engagement of the "disk" elements 24 with the sides 40 of the rotor produces application of the arcuate "shoe" 26.

Simultaneously with the buildup of pressure in the cylinder 34 of unit 22, there is communicated fluid pressure to the cylinder 34 in unit 20 by way of the conduit 120. When fluid pressure builds up in the cylinder of unit 20, the applied "disk" friction elements shift circumferentially with the rotor in a counterclockwise direction. In this direction, it will be noted that the shoe is rotated with the casting 30 in a counterclockwise direction so that it moves away from surface 75 of the rotor 42 toward a retracted position. As the casting 30 rotates in a counterclockwise direction about its associated anchor 18, the extent of counterclockwise rotation is determined by engagement of the casting with anchor 70. None of this turning force of casting 30 is transmitted to unit 22. The torque reaction from application of the disk elements of unit 20, is resisted by a combination of anchors 18 and 70. The "shoe" 26 is pivoted counterclockwise on anchor 28 by the counterclockwise rotation of casting 30 so that no "shoe" braking is supplied by unit 20 during braking with forward vehicle movement.

When the arcuate "shoe" 26 is applied, it often happens that the friction lining 56 is not entirely concentric with the engageable surface 75 of the rotor. This condition could be corrected by "wearing in" of the lining 56 but unfortunately, brake performance is very erratic while the arcuate lining segment is "wearing in"; and, furthermore, this results in inefficient utilization of available lining since the wear pattern causes uneven attrition of the lining. In order to remedy pinching of the lining 56 at the heel or toe, the arcuate shoe 26 is free floating. Thus, if the lining 56 contacts at only the toe or the heel of the lining, then the curved end 62 can slide on the anchor 28 to correct this condition; thus, the lining 56 will be brought into full contact with the surface 75 of the rotor along the entire length of the arcuate lining segment 56. When the brake is applied with forward vehicle movement, the strut 118 automatically adjusts the arcuate "shoe" element according to the extent of wear of the lining segment 56.

As the operator releases applying effort, the casting 88 is rotated slightly in a clockwise direction by a spring 119 which is associated with the automatic adjuster 118. This is possible because of lost motion between pin 48 and adjuster 118. As the casting 88 is rotated clockwise, the shoe 26 is moved therewith since spring 74 causes the shoe to pivot on curved end 62.

When the brake is applied with reverse vehicle movement (clockwise turning of the rotor, Figure 1), the disk friction elements of each of the units produce clockwise turning of the respective castings about their associated anchors 18. Clockwise turning of casting 88 produces clockwise turning of shoe 26, tending to withdraw friction material lining 56 from engagement with surface 75 of the rotor. Clockwise turning of casting 88 acts through automatic adjuster 118 to exert clockwise turning effort on casting 30. Thus, in addition to the force developed by the disk elements 24 of unit 20 there is further supplied the force developed by the disk elements associated with unit 22.

As the casting 30 turns on its associated anchor 18, it pushes on the arcuate shoe friction element 26 at the point of abutment 84. The arcuate shoe 26 is thus caused to pivot on end 62 asssociated with anchor 28. When the lining 56 is fully applied, further pivoting is prevented. Reaction force, exerted by the rotor through surface 75, limits extent of turning of the arcuate shoe which in turn limits the extent of turning of casting 30 on anchor 18.

During reverse vehicle movement, a total of two pairs of disk elements and one arcuate shoe friction element are applied; the torque reaction from the two pairs of disk elements supply the applying effort for the arcuate "shoe" element. The arcuate "shoe" is more effective during braking with reverse vehicle movement than with forward vehicle movement since applying effort is greater. The purpose for this is that axle load changes with direction of vehicle movement during braking and this difference in axle loading necessitates a change in braking effectiveness. When the vehicle is braked while moving in reverse, the rear axle load increases and, hence, the brake must become more effective. When the vehicle is moving forwardly during braking, the axle load is lower and, therefore, the brake need not be as effective.

When the brake is released, the casting 30 is rotated in a counterclockwise direction about anchor 18 by the spring 72. This counterclockwise turning of the casting 30 about its associated anchor 18 permits the spring 74 to rotate the arcuate "shoe" 26 on curved end 62, thereby pivoting the arcuate shoe in a direction causing disengagement of lining 56 from surface 75 of the rotor. The curved end 62 of the arcuate friction element is maintained in engagement with the anchor 28 by reason of the spring 74 which exerts a force on the shoe in a direction pulling it against the anchor. The arcuate shoe is designed to turn and slide on the curved end 62; the arcuate "shoe" is freely floatable within the brake assembly. Thus, the shoe 26 can slide radially on its curved end 62 to relieve pinching at the toe or heel end of the lining segment 56. This combination of radial sliding and turning of the shoe enables the necessary movement required to bring friction surface 56 into complete contact with surface 75 of the rotor.

An important feature of the invention is that the "disk" friction elements comprise the portion of the brake which is under the direct control of the operator. The "shoe" operation has no influence whatsoever on the pedal characteristics of the brake. For this reason, the pedal characteristic is not influenced by such thermal effects as diametral drum expansion.

*Parking brake operation*

When the parking brake is applied, friction elements 104 and 106 are mechanically actuated by articulated levers 108 so that they are brought into engagement with surfaces 40 of the rotor. The friction elements 104 and 106 will shift with the rotor in either a clockwise or counterclockwise direction, depending upon the direction of movement of the vehicle. When friction elements 104 and 106 shift circumferentially, they produce turning of the casting 88 in either a clockwise or counterclockwise direction about anchor 18 by reason the connecting ball-and-ramp camming device 102. This turning of casting 88 applies either the arcuate shoe element 26 associated with unit 22 when the rotor turns in a counterclockwise direction or the arcuate shoe 26 associated with unit 20 when the rotor turns in a clockwise direction.

The brake may be thus either hydraulically applied or mechanically applied through parking brake operation. With parking brake operation, the vehicle is locked in a stationary position when the brakes are "on."

*Front wheel brakes*

Referring next to the embodiment shown in Figures 9 to 13, components of the brake corresponding to those previously described, will receive the same reference numeral with the subscript "a."

The support member 12a (Figure 10) is secured to a stationary part of the vehicle, such as a steering knuckle 14a, by means of fastening members which may consist of bolts or the like. Rotor 42a is fastened to a movable part of the vehicle as, for example, a hub (not shown) in any suitable manner. The rotor has three distinct friction element engaging surfaces, a cylindrical "drum" surface 75c and two spaced-apart annular friction surfaces 40a.

Brake units 20a and 22a are located at opposite sides of the support member 12a. Each of the friction units is identically constructed so the following detailed description of one may suffice for both.

Friction unit 20a includes "disk" elements 24a and an arcuate "shoe" friction element 26a. The disk friction elements are carried by a casting 30a which is mounted on an anchor 18a. The casting 30a is formed with a cylinder 34a at the one end thereof. The cylinder bore 37a slidably receives a pair of pistons 36a. Between the pistons and "disk" friction elements are thrust members 38a.

Each "disk" friction element 24a consists of a flat backing member 44a and a segment of lining 46a which is attached to the backing member 44a.

Figure 13:
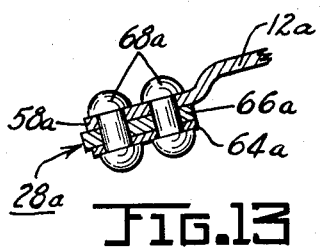
Figure 14:
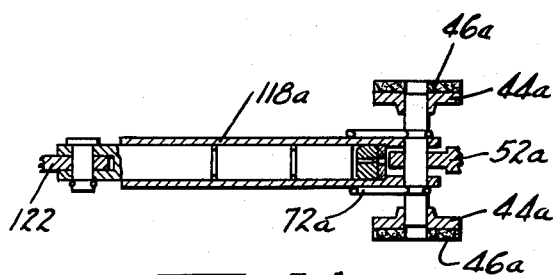
Figure 9:
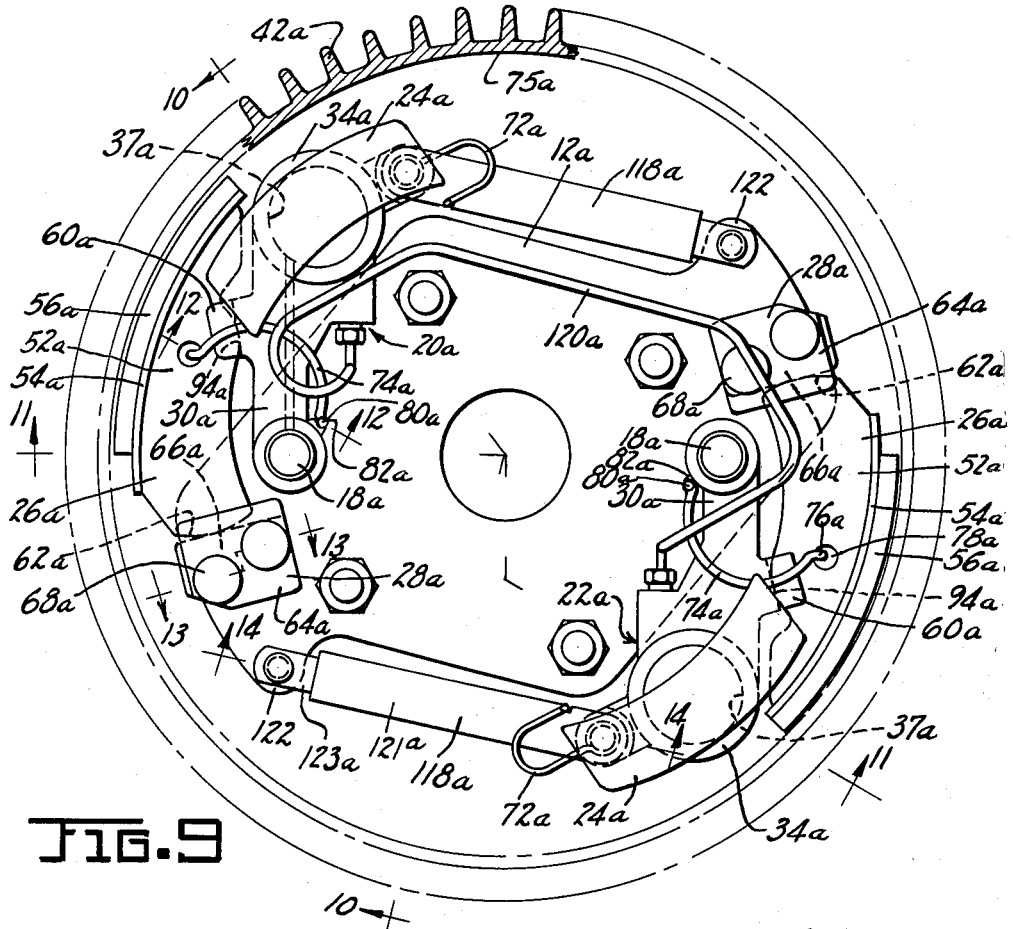
Figure 9 shows the front wheel brake assembly in side elevation.
Figure 11:
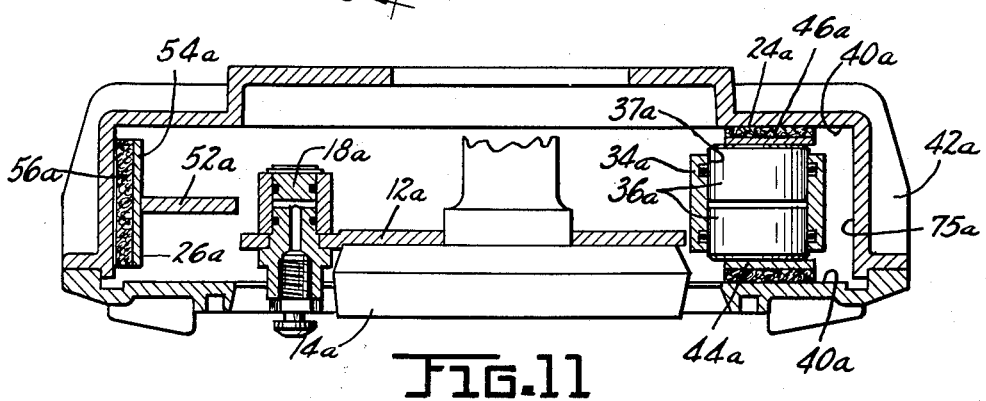

The arcuate "shoe" element 26a consists of a strengthening web 52a, an arcuate rim 54a, and a lining segment 56a which is secured to the rim and is engageable with surface 75a of the rotor. End 62a of the arcuate shoe 26a is curved so that the shoe can pivot on its associated anchor 28a. The end 62a bears against the flat anchoring surface of a plate 66a (Figure 13). The plate 66a is fastened to the support member 12a by means of two rivets or the like 68a.

The arcuate "shoe" element 26a is positioned laterally at its anchored end by a plate 64a which contacts one side of the web 52a. An offset part 58a of the support member contacts the other side of the web 52a. The shoe element is further guided laterally by means of projecting arms 60a, which are formed integrally with the casting 34a and loosely embrace opposite sides of the web 52a. It will thus be seen that while the shoe element 26a is maintained in a proper lateral position, it is free to shift radially on its associated anchor 28a. Since the arcuate shoe element 26a is free floating, it can slide on the curved end 62a in order to relieve pinching of the lining at either the heel or the toe end, and in this way the surface of lining 56a is brought into concentricity with the engageable surface 75a of the rotor.

Rotation of casting 30a on anchor 18a causes the arcuate "shoe" element to pivot at end 62a. The casting and the arcuate shoe element are in abutting relation at point 94a. The casting is here formed with a flattened surface which bears against an edge of the web 52a; as the casting 30a is caused to turn, the turning movement produces a thrust on the shoe at this point.

The arcuate shoe 26a is adjusted automatically by a device 118a which further serves to retard the rate of application of the arcuate shoe in order to reduce brake noise. Specific construction details are considered and claimed in my copending application No. 521,214 filed July 11, 1955. Reference is made to this copending application wherein the device is claimed.

A spring 72a, which is associated with automatic adjuster 118a, exerts a slight retracting force on the casting 30a. A second spring 74a maintains the arcuate shoe in contact with the casting 30a. The arcuate shoe 26a is pivoted on end 62a when the casting 30a is caused to turn so that lining 56a is retracted from surface 75a of the rotor. The spring 74a has one leg 80a which is located in a notch 82a in the casting 30a. The other leg 76a of the spring passes through an opening 78a in the web 52a of the arcuate friction element 26a. The spring is located so that the force of spring 74a is divided into two components, one of which lies in a direction urging the shoe segment 26a against the anchoring surface of plate 66a; the other component produces a pivoting of the arcuate shoe which brings the edge of the web against surface 94a of the casting.

External conduit 120a communicates fluid pressure between the units so that only one of the units is connected with a fluid pressure source. Fluid pressure which is communicated to the first unit will be transmitted to the second unit for actuation of disk elements thereof.

The automatic adjusters 118a are fastened between the respective castings 30a and projections 122 of the support member 12a. The casting 30a anchors through the automatic adjuster 118a on the projection 122 when the casting turns clockwise on anchor 18a.

*Operation of front wheel brakes*

When the operator applies the brake while the vehicle is moving forwardly (rotor turning counterclockwise, Figure 9), fluid pressure is communicated to cylinder 34a in unit 22a, thus spreading the pistons 36a. "Disk" friction elements 24a are forced apart so that friction material 46a forcibly engages the rotor. The wiping action between sides 40a of the rotor and the friction material 46a causes the friction elements 24a to shift in a circumferential direction with the rotor. As the "disk" friction elements 24a shift with the rotor, the casting 30a is turned about its associated anchor 18a in a counterclockwise direction. This rotation of the casting imparts a thrust on the arcuate "shoe" friction element 26a, since the casting bears against the web 52a of the arcuate shoes at 94a.

The arcuate shoe element 26a is caused to pivot on the anchor 28a at its curved end 62a, and this pivotal movement of the arcuate shoe forcibly applies the friction lining segment 56a against surface 75a of the rotor. If there should occur pinching at the toe or heel end of the lining owing to eccentricity of lining and rotor, then the "shoe" can slide radially on the anchor 28a to bring the lining into concentricity with the cylindrical surface 75a of the rotor.

When the brake is applied so that the casting moves in a counterclockwise direction on its anchor, the automatic adjuster 118a functions to determine the retracted position for the arcuate shoe. That is, owing to the wear of the friction segment 56a which is incident to brake application, there develops an increasing clearance between the released and applied position of the arcuate shoe. The automatic adjuster, however, compensates for this wear so that clearance between the engageable surface of the rotor and the lining remains substantially constant.

When the arcuate shoe element is fully applied against the rotor, it is no longer free to pivot about anchor 28a, and being thus fixed in a radial sense, it limits the extent of rotation of the casting which is produced by engagement of the disk elements with the rotor. It will thus be seen that the applying effort on the shoe is supplied by the disk elements and that rotor reaction force, acting on the arcuate shoe, determines the amount of turning of the casting 30a. During forward application, the anchoring forces are distributed between anchor 18a and anchor 28a, the anchor 18a being associated with the "disk" elements and the anchor 28a being associated with the arcuate "shoe" element.

During brake application, the arcuate shoe remains free floating; it can move with a combination of pivotal and sliding movement, thus bringing its arcuate friction surface into completely conformable relation with surface 75a of the rotor. This increases the wear-life of the brake since a greater amount of lining on the arcuate shoe is utilized. Another beneficial result of the free floating feature is that localized wear is prevented at any segment of the arcuate lining along the length thereof.

When the operator releases applying effort following a brake application with forward vehicle movement, pressure is relieved in the cylinders 34a permitting the "disk" friction elements 24a to move away from the sides 40a of the rotor. A spring force in the automatic adjuster 118a then overcomes any tendency of the disk elements to shift in a circumferential direction, thus causing the casting to turn clockwise about its associated anchor 18a. The arcuate shoe 26a is caused to turn on its associated anchor 28a since the spring 74a holds the arcuate shoe 26a against the casting 30a. The arcuate shoe is also maintained in engagement with anchor 28a during applied and released positions since the spring further exerts a force component urging the curved end 62a against the anchor 28a.

The spring 74a exerts a force in a direction so that one component thereof maintains the arcuate shoe in abutment with the casting at surface 94a.

When the brake is applied with reverse vehicle movement (rotor moving clockwise, Figure 9), the castings 30a turn in a clockwise direction about their respective anchors 18a. Engagement of the disk elements with the rotor produces a "wiping-action" between the disk elements and rotor, thus causing a clockwise turning of the castings on anchors 18a. When the castings turn in a clockwise direction, the arcuate shoe segments 56a are withdrawn from surface 75a so that braking action is limited to "disk" brake elements. The extent of clockwise turning by the castings 30a is limited by automatic adjusters 118a which are fastened to the projections 122 of the support member 12a. The automatic adjusters 118a serve as anchors in that they transmit anchoring load from the castings to backing plate 12a through the projections 122. The anchoring load for the "disk" elements is distributed between projections 122 and anchors 18a.

Increased clearance develops between the lining segment 56a and surface 75a of the rotor following a brake application with reverse vehicle movement. Considerable clearance between the arcuate friction segment 56a and surface 75a of the rotor might give rise to brake noise. This condition is remedied by the automatic adjuster 118a which retards the rate of turning of the casting 30a, thus preventing an excessive rate of application of the arcuate shoe segment 26a. It has been by experience that reducing the rate of application of the arcuate shoe will lower the sound level of brake application noises which are incident to brake application.

From a consideration of the construction and operation of the invention, it is apparent that I have met the various requirements and objectives which were set forth for the invention at an earlier part of this disclosure. It has been possible, for example, by providing two anchors to select the ideal lever ratio through which applying effort is exerted by the disk elements on the arcuate shoe element. Furthermore, it is possible by separating the anchors for the two friction elements to move the anchor associated with the arcuate shoe in a radial sense in order to increase the anchor ratio for the arcuate friction element. Because of this increase in anchor ratio, I make the brake more controllable and prevent possibility of "brake lockup."

The free floating construction for the shoe increases the utilizable wear-life of the lining, facilitates assembly of the shoe and its adjustment, and provides that the shoe will automatically achieve full contact with the cylindrical surface 74a of the rotor.

Another advantage of the construction shown is that obtained by distributing the anchoring load with a greater number of anchors. Because there are a plurality of anchors, I reduce the loading for any one anchor, and thus make it possible to take a higher order of torque loads.

It is apparent that the invention may be modified in many respects; the various construction features and performance characteristics of the device can be changed to suit requirements.

Although only a selected number of embodiments of the invention have been disclosed, this has been only to exemplify the principles thereof. It will be understood that the description and example embodiments are not limitative of the invention but are rather illustrative of the principles thereof.

I claim:

1. In a kinetic-energy-absorbing device, two brake units each comprising disk elements which are oppositely-actuated and are initially applied under substantially equal lateral applying force to effect substantially equalized braking effort thereby obtaining laterally balanced force on each of said brake units, a leverage member which is combined with the disk elements and is turned in a plane perpendicular to their direction of application by said disk elements, an arcuate friction element applied by said leverage member, two anchor members, one associated with each of said arcuate and disk elements, said arcuate friction element being mounted for floatable movement in a plane parallel to said first mentioned plane on the associated anchor and guided in said plane by projecting arms on said leverage member.

2. A brake unit comprising a separable two-part construction, one of said parts having associated oppositely-acting disk elements which are actuated in opposite directions under substantially equal applying force to effect substantially equal braking action therebetween whereby said brake unit is laterally balanced, a first anchor for said disk elements which is combined with said one part and serves as a pivot for said part to provide for turning thereof in a plane perpendicular to the direction of actuation of said disk elements, and a second anchor for said disk elements limiting angular pivotal movement of said one part in one direction, the other of said parts having an associated arcuate friction element and an anchor for said arcuate friction element, said arcuate element being free-floating in a plane parallel to said first mentioned plane, and spring means fastened between said parts to retain them in assembled relation, said spring being located in relation to said arcuate friction element and associated anchor to exert retracting force on said arcuate friction element and hold the arcuate friction element against its associated anchor.

3. A kinetic-energy-absorbing device comprising: a supporting member, a brake unit carried by said supporting member and including a pivoted casting, a cylinder formed in said casting at one end thereof with the axis of said cylinder located perpendicular to the plane of pivotal movement of said casting, oppositely acting pistons received in said cylinder, two friction elements associated with said pistons which are movable in opposite directions under substantially equal applying force to develop substantially equal braking effort therebetween to produce pivoting of said casting, a second friction element which is applied radially relative to the center of said supporting member and is mounted independently of said casting on said supporting member, means for supporting said second friction element and providing for slidable movement thereof relatively to said two friction elements, means for maintaining said second friction element in a normally released position, abutment means between said casting and second friction element which translates pivoting movement of said casting in one angular direction to radial applying thrust on said second friction element, and anchoring means associated with said pivoted casting to limit pivotal movement thereof in the opposite angular direction.

4. In a brake, a rotor having two flat surfaces and one cylindrical braking surface, a supporting member, two arcuate brake shoes which are individually mounted on said supporting member, anchoring means attached to said supporting member and associated with each of said brake shoes, said brake shoes being slidable on said anchoring means so that floatable movement thereof brings the arcuate friction surface into conformity with the cylindrical surface of said rotor, a pair of second friction elements provided for each of said arcuate brake shoes, said second elements being oppositely-acting along a line perpendicular to the plane of movement of said arcuate shoes and mounted for pivotal movement independently of said shoes in a plane parallel to said first mentioned plane in such a way to serve as actuators for said shoes, means for applying said oppositely acting second frictional elements with substantially equal applying force to develop substantially equal braking action therebetween and thereby effecting laterally balanced force, said second friction elements being so arranged that pivotal movement in one direction exerts applying effort on the associated arcuate shoe, and anchoring means associated with said second friction elements to limit pivotal movement in the opposite direction.

5. A kinetic-energy-absorbing device comprising: a brake rotor having two plane and one cylindrical braking surfaces, a supporting member, a brake unit carried by said supporting member and including a casting, means for mounting said casting for pivotal movement on said supporting member, a cylinder formed in said casting at one end thereof and disposed with the cylinder axis parallel to the pivotal axis of the casting, oppositely acting pistons received in said cylinder, a friction element associated with each of said pistons and engageable with spaced parallel sides of said rotor to produce pivoting of said casting, a second friction element which is pivoted on said supporting member independently of said casting and on an axis parallel to the pivotal axis of said casting, said second friction element being slidably associated with the supporting member in a plane perpendicular to the pivotal axis of said element so that floatable movement of said second element is obtained, means for disengaging said second friction element from the cylindrical surface of said rotor, abutment means between said casting and second friction element which provides for substantially free slidable movement of said second friction element and translates pivoting movement in one direction of said casting to applying thrust on said second friction element, anchoring means associated with said pivoted casting to limit pivotal movement thereof in the opposite direction, and resilient means for holding said casting in abutting position against said anchoring means.

6. In a kinetic-energy-absorbing device including a rotor, a friction unit comprising a supporting means, oppositely acting first friction elements mounted on said supporting means for actuation apart into frictional engagement with said rotor, said first friction elements being mounted for pivotal movement in a plane perpendicular to their direction of actuation, and a second friction element which is applied against said rotor radially relative to the center of said supporting means and which is pivoted on said supporting means independently of said first friction elements, means forming an abutment between said first and second friction elements and coacting therebetween for translating pivotal movement of said first friction elements to pivotal applying movement of said second friction elements, a first and second anchoring means on said supporting means for resisting anchoring load of said first friction elements, and a third anchoring means on said supporting means at which said second friction element is pivoted.

7. In a brake including a rotor, a supporting member, and a brake unit carried by said supporting member, said brake unit comprising a carrier mounted on said supporting member for pivotal movement thereon, two oppositely-applied friction elements which frictionally engage spaced apart parallel sides of said rotor to produce turning of said pivoted carrier in a plane perpendicular to the line of application of said friction elements, a floatable second friction element which pivots and turns on an associated anchoring element in a plane parallel to the plane of pivotal movement of said carrier, and a first and second anchoring means secured to said supporting member for mounting said carrier on said supporting member, said carrier and second friction element being arranged in abutting relation so that turning of said carrier produces pivotal actuation of said second friction element.

8. In a brake including a rotor, a supporting member, two arcuate brake shoes which are individually mounted on said supporting member, anchoring means attached to said supporting member and associated with each of said brake shoes, said brake shoes being pivoted and slidable on said anchoring means so that floatable movement thereon radially outwardly relative to the center of said supporting member brings the arcuate friction surface into conformity with the engageable surface of said rotor, a pair of oppositely acting friction elements provided for each of said arcuate brake shoes, said friction elements being actuatable transversely to the direction of movement of said arcuate shoes and mounted for pivotal movement independently of said arcuate shoes in a plane perpendicular to the direction of actuation of said friction elements to serve as actuators for said arcuate shoes, said friction elements being mounted so that pivotal movement in one direction exerts applying effort on the associated arcuate shoe, and anchoring means operatively secured to said supporting means and providing a mounting for said friction elements to limit pivotal movement in the opposite direction.

9. In a brake including a rotor, two spaced pairs of oppositely acting friction elements which are spread apart during actuation, two arcuate brake shoes, one associated with each of said spaced pairs of friction elements, means for independently mounting said friction elements and arcuate shoes for pivotal movement in the same plane and providing floatable movement of said arcuate shoes in the plane of said pivotal movement, means for exerting retracting force on said arcuate brake shoes, an adjustable strut operatively joining said arcuate brake shoes to communicate applying force on one of the shoes during braking in one direction of rotor movement, and auxiliary applying means associated with one of said arcuate shoes to produce application thereof.

10. In a brake, a rotor, a supporting member, and two friction units mounted on said supporting member and spaced circumferentially relative to the center of said supporting member, each of said units comprising pivoted first and second friction means indepedently mounted on said supporting member for pivotal movement in the same plane, said first means being oppositely applied disk elements and the second means being a friction element which is applied radially relative to the center of said supporting member, means for communicating pivotal movement of said first friction means as applying effort on said second friction means, and a first and second anchoring means coacting with said disk elements and a third anchoring means coacting with said radially applied friction elements.

11. In a kinetic-energy-absorbing device, two brake units each comprising disk elements and an arcuate shoe element, an anchoring device coacting with each of said disk and shoe elements and providing pivotal support therefor, means for mounting said arcuate shoe element at its coacting anchoring device for floatable movement in a plane perpendicular to the direction of actuation of said disk elements, and a thrust member for each of said units mounted at the anchor associated with the disk elements for pivotal movement in a plane parallel to the plane of movement of said arcuate element, said thrust member serving to translate the anchoring reaction of the disk friction elements into applying force on the arcuate friction element, said thrust members including means to locate and support the arcuate friction elements in their plane of movement while permitting relative movement in said plane between the thrust members and arcuate friction elements.

12. In a kinetic-energy-absorbing device including a rotor, a swingable housing, disk elements which are oppositely movable and are combined with said housing and shiftable in a plane perpendicular to their direction of opposed movement, an auxiliary set of disk elements associated with said housing and shiftable in the same plane as said first mentioned disk elements, each of said sets of disk elements being arranged to produce turning of said housing, an anchoring means which limits the swingable movement of said housing, an arcuate friction element laterally supported by said housing and actuated by turning movement of said housing to engage said rotor, means for mounting said arcuate element for floatable movement in a plane parallel to the plane of shifting of said disk elements, and a second anchoring means associated with said arcuate friction element to serve as a pivot therefor.

13. In a kinetic-energy-absorbing device including a rotor, a housing, anchoring means pivotally supporting said housing, two sets of disk brake elements including means for connecting them to said housing, one set being on each side of said anchoring means, means for shifting each of said sets into engagement with said rotor along a line parallel to the axis of turning movement of said housing and arranged to produce turning of the housing on said anchoring means, a floating friction element carried by said housing and actuated by the turning movement of said housing under the influence of either set of disk brake elements to engage said rotor, and second anchoring means fixed relative to said first anchoring means and coacting with said first anchoring means to provide anchoring for said floating friction element.

14. A friction unit comprising a carrier for disk brake elements, an arcuate shoe brake element, and spring means fastened between said carrier and shoe brake element to maintain them in an abutting assembled relation, said spring being disposed in relation to said arcuate shoe brake element that the spring means exerts a retracting force thereon and holds the arcuate shoe against an associated anchor.

15. In a brake including a rotor, the structure comprising, a carrier, a pair of oppositely actuated disk elements, means for mounting said disk elements in said carrier member and providing a connection therebetween by which movement of said disk elements in a plane perpendicular to their direction of actuation develops a turning force on said carrier member, a second friction element, an anchor member coacting with said second friction element and providing slidable movement thereon in a plane perpendicular to the direction of actuation of said disk element, and means operatively connecting said housing and second friction element whereby turning of the carrier member is communicated as applying effort against the second friction element.

References Cited in the file of this patent

UNITED STATES PATENTS

| | | |
|---|---|---|
| 1,603,963 | Liebowitz | Oct. 19, 1926 |
| 1,928,630 | Penrose | Oct. 3, 1933 |
| 2,065,382 | Levy | Dec. 22, 1936 |
| 2,602,525 | Jurgens | July 8, 1952 |
| 2,629,473 | Vincent | Feb. 24, 1953 |
| 2,751,046 | Tack | June 19, 1956 |

UNITED STATES PATENT OFFICE
CERTIFICATE OF CORRECTION

Patent No. 2,937,720  May 24, 1960

Richard T. Burnett

It is hereby certified that error appears in the printed specification of the above numbered patent requiring correction and that the said Letters Patent should read as corrected below.

Column 2, line 27, for "As" read -- At --; column 3, line 66, for "466,862" read -- 466,861 --; column 4, line 27, for "pisotons" read -- pistons --; line 37, for "and" read -- as --; column 9, line 1, for "by" read -- my --.

Signed and sealed this 3rd day of January 1961.

(SEAL)
Attest:

KARL H. AXLINE
Attesting Officer

ROBERT C. WATSON
Commissioner of Patents